(12) United States Patent
Phillips et al.

(10) Patent No.: US 10,177,539 B2
(45) Date of Patent: Jan. 8, 2019

(54) METHOD AND TOOLING FOR MAKING AN INSULATOR FOR A CONDITION SENSING SPARK PLUG

(71) Applicant: FEDERAL-MOGUL IGNITION COMPANY, Southfield, MI (US)

(72) Inventors: Paul William Phillips, Brighton, MI (US); William J. Walker, Jr., Ann Arbor, MI (US); Michael E. Saccoccia, Canton, MI (US)

(73) Assignee: FEDERAL-MOGUL IGNITION COMPANY, Southfield, MI (US)

( * ) Notice: Subject to any disclaimer, the term of this patent is extended or adjusted under 35 U.S.C. 154(b) by 315 days.

(21) Appl. No.: 15/005,426

(22) Filed: Jan. 25, 2016

(65) Prior Publication Data

US 2016/0218488 A1    Jul. 28, 2016

Related U.S. Application Data

(60) Provisional application No. 62/108,861, filed on Jan. 28, 2015.

(51) Int. Cl.
| | |
|---|---|
| *H01T 21/02* | (2006.01) |
| *B28B 11/24* | (2006.01) |
| *H01T 13/38* | (2006.01) |
| *B23D 3/02* | (2006.01) |
| *B23D 13/00* | (2006.01) |

(Continued)

(52) U.S. Cl.
CPC ............ *H01T 21/02* (2013.01); *B23D 3/02* (2013.01); *B23D 13/00* (2013.01); *B28B 11/243* (2013.01); *H01T 13/20* (2013.01); *H01T 13/38* (2013.01); *H01T 13/40* (2013.01); *B23B 2260/108* (2013.01); *B23B 2270/10* (2013.01)

(58) Field of Classification Search
CPC .................................. B28B 7/28; H01T 21/02
USPC ......................... 264/632, 635, 614, 618, 678
See application file for complete search history.

(56) References Cited

U.S. PATENT DOCUMENTS

| | | | | |
|---|---|---|---|---|
| 2,273,990 | A | * 2/1942 | Rabezzana | .............. H01T 21/02 |
| | | | | 123/169 EL |
| 2,301,686 | A | * 11/1942 | Doran | ..................... H01T 13/39 |
| | | | | 123/169 C |

(Continued)

FOREIGN PATENT DOCUMENTS

| | | |
|---|---|---|
| CA | 1139856 | 1/1983 |
| DE | 884432 C | 7/1953 |

(Continued)

OTHER PUBLICATIONS

Office action issued by the German Patent Office for application No. 10 2016 101 315.3.

*Primary Examiner* — Erin Snelting
(74) *Attorney, Agent, or Firm* — Reising Ethington, P.C.

(57) ABSTRACT

Methods of making an insulator for a condition sensing spark plug and tooling that can be used to perform the various methods, the tooling and methods involving machining one or more channels in the insulator body. The machined channels can be used to accommodate one or more wires from a sensing, display, or processing device. In one particular example, the wires are thermocouple wires used to sense temperature in an internal combustion engine while the spark plug is in use. The methods and tooling may result in channels that are formed more precisely, economically, and efficiently.

9 Claims, 12 Drawing Sheets

(51) Int. Cl.
*H01T 13/20* (2006.01)
*H01T 13/40* (2006.01)

(56) References Cited

U.S. PATENT DOCUMENTS

| | | | | |
|---|---|---|---|---|
| 2,305,877 | A * | 12/1942 | Klingler | B28B 1/24 264/328.16 |
| 3,337,668 | A * | 8/1967 | Mohle | B28B 3/02 235/1 B |
| T866,031 | I4 * | 9/1969 | Johns | H01T 21/02 445/7 |
| 3,940,987 | A | 3/1976 | Green | |
| 4,011,654 | A * | 3/1977 | Beaudoin | G01N 27/12 264/614 |
| 4,185,061 | A * | 1/1980 | Hinton | B28B 3/02 264/332 |
| 4,368,166 | A | 1/1983 | Hinton | |
| 4,440,706 | A * | 4/1984 | Hoffman | B28B 3/003 264/570 |
| 4,564,493 | A * | 1/1986 | Shintani | B22D 41/52 264/209.1 |
| 5,514,314 | A | 5/1996 | McDougal | |
| 6,094,990 | A | 8/2000 | Lykowski et al. | |
| 6,122,971 | A | 9/2000 | Wlodarczyk | |
| 6,204,594 | B1 | 3/2001 | Ingham | |
| 6,822,378 | B2 | 11/2004 | Nishikawa et al. | |
| 6,952,948 | B2 | 10/2005 | Herbert et al. | |
| 8,941,385 | B2 | 1/2015 | Patti | |
| 9,698,573 | B2 * | 7/2017 | Walker, Jr. | H01T 13/34 |
| 2012/0068390 | A1 * | 3/2012 | Walker, Jr. | H01T 13/38 264/632 |
| 2014/0138122 | A1 | 5/2014 | Walker, Jr. | |
| 2015/0322892 | A1 * | 11/2015 | Whitmore | F02K 9/94 60/251 |

FOREIGN PATENT DOCUMENTS

| | | |
|---|---|---|
| DE | 3203149 C2 | 4/1990 |
| DE | 10035536 A1 | 2/2002 |
| DE | 69935223 T2 | 10/2007 |
| DE | 60224475 T2 | 1/2009 |
| EP | 0225713 A1 | 6/1987 |
| GB | 2300968 A | 11/1996 |
| JP | S6454686 A | 3/1989 |

* cited by examiner

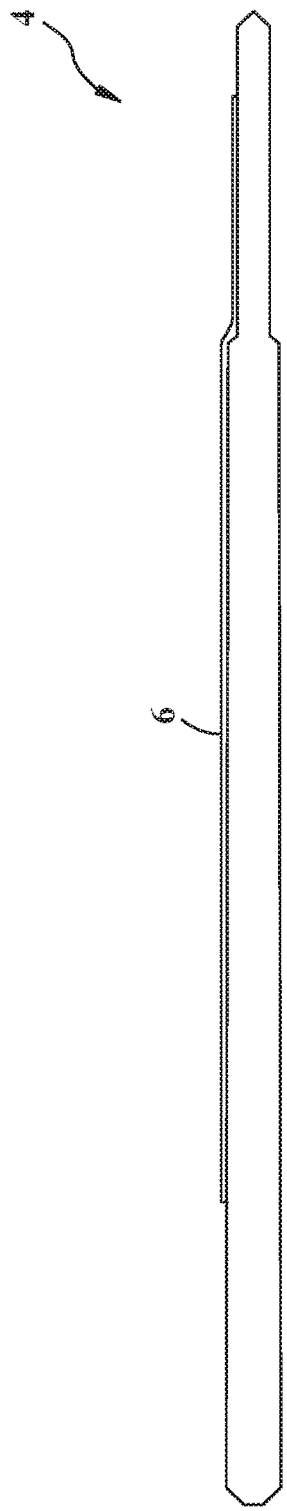
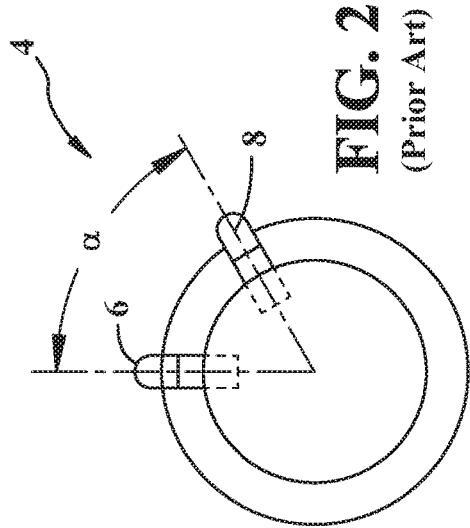
FIG. 1
(Prior Art)
FIG. 2
(Prior Art)

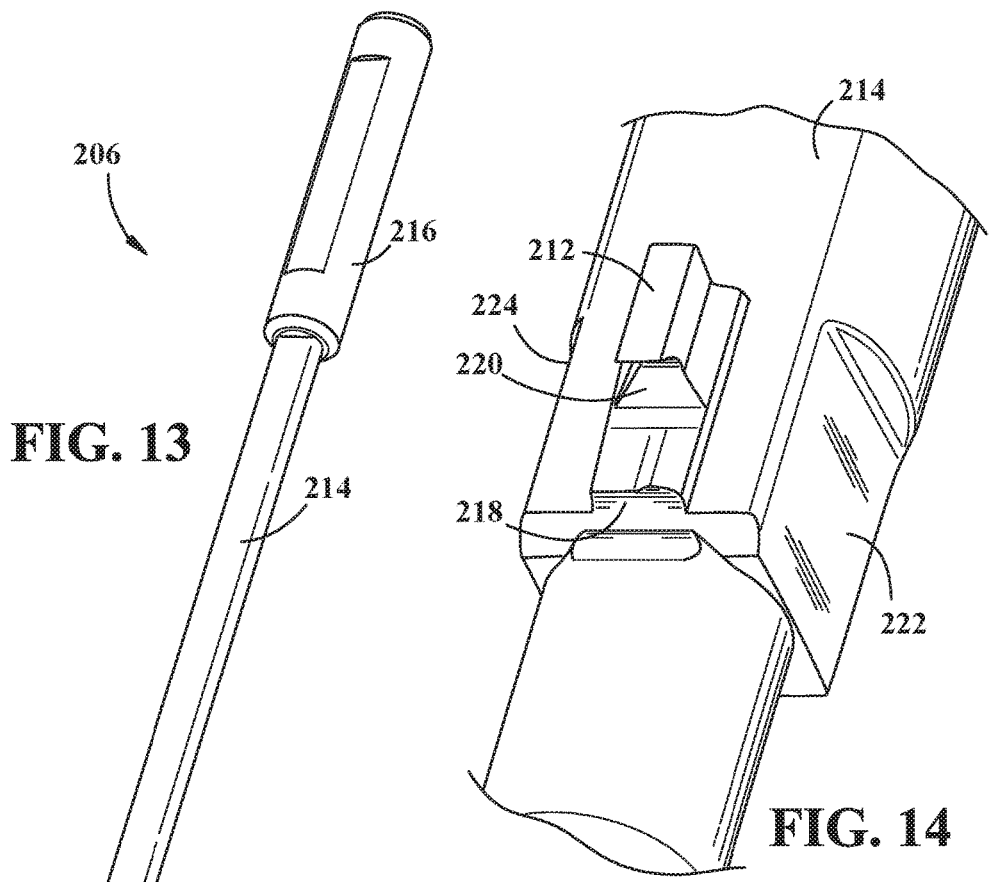
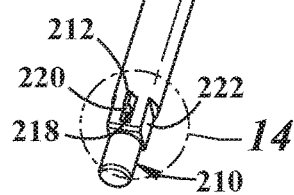
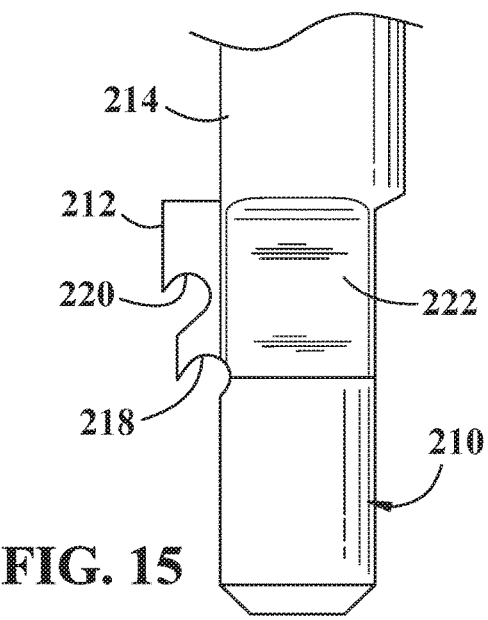
FIG. 13
FIG. 14
FIG. 15

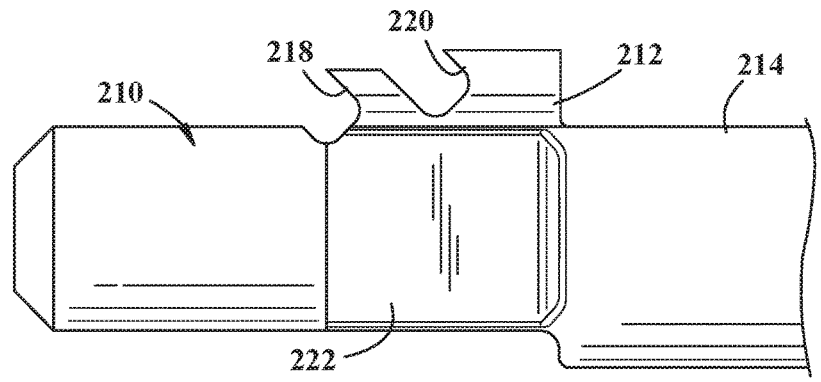
FIG. 16
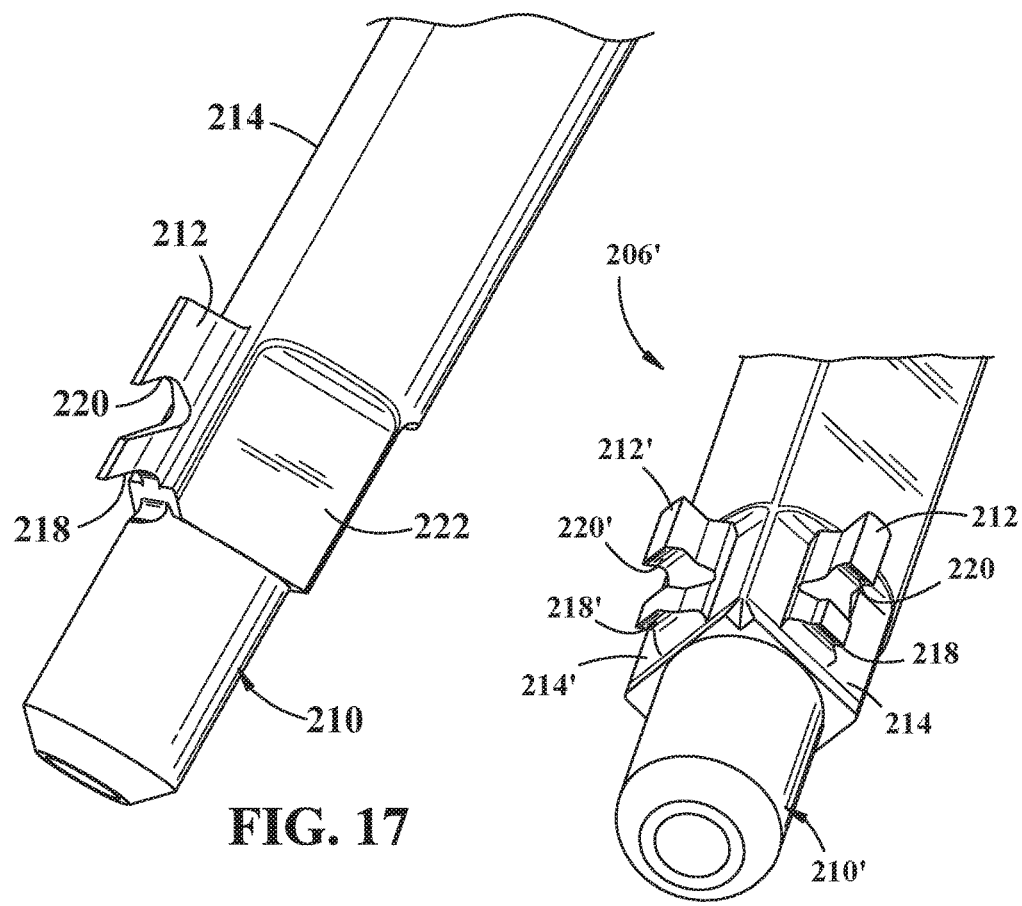
FIG. 17
FIG. 21

METHOD AND TOOLING FOR MAKING AN INSULATOR FOR A CONDITION SENSING SPARK PLUG

This application claims the benefit of U.S. Provisional Application No. 62/108,861, filed on Jan. 28, 2015 the contents of which are hereby incorporated by reference in their entirety.

FIELD

This disclosure generally relates to spark plugs for sensing engine conditions and, more particularly, to methods and tooling for making insulators for condition sensing spark plugs.

BACKGROUND

Sensing various engine conditions while an engine is running can be an important tool for understanding engine performance, diagnosing engine problems, and developing the appropriate spark plug and spark plug firing conditions for a particular engine. Commonly, temperature is measured in an internal combustion engine with a thermocouple spark plug which includes partially or fully embedded thermocouple wires in the ceramic insulator of the spark plug. The tooling involved in manufacturing insulators for condition sensing spark plugs, such as finned or other specialized shaping arbors, can be expensive and is oftentimes broken or damaged during manufacturing processes because of the close tolerances required.

SUMMARY

In accordance with one embodiment, there is provided a method of making an insulator for a condition sensing spark plug. The method comprises the steps of forming an insulator body from ceramic materials. The insulator body includes a nose portion, a terminal portion, an intermediate portion between the nose portion and the terminal portion, and an axial bore extending the axial length of the insulator body. The method includes the step of machining at least one channel along the axial bore of the insulator body. The channel accommodates a wire for the condition sensing spark plug.

In accordance with another embodiment, there is provided a method of making an insulator for a condition sensing spark plug. The method comprises the steps of holding an insulator body having an axial bore with an insulator holder, placing a machining arbor having one or more cutting elements into the axial bore of the insulator body, and moving the machining arbor relative to the insulator body by coupling a displacement generator to the machining arbor. The relative movement between the machining arbor and the insulator body forms at least one channel along the axial bore of the insulator body.

In one embodiment, there is provided tooling equipment for making an insulator for a condition sensing spark plug. The tooling equipment comprises a machining arbor having one or more cutting elements for machining channels in an insulator, an insulator holder for securing the insulator, and a displacement generator coupled to the machining arbor, the insulator holder, or both the machining arbor and the insulator holder. The displacement generator provides relative movement between the machining arbor and the insulator that can be used to form at least one channel in the insulator.

DRAWINGS

Preferred exemplary embodiments of the invention will hereinafter be described in conjunction with the appended drawings, wherein like designations denote like elements, and wherein:

FIG. 1 shows a shaping arbor that may be used to make an insulator for a condition sensing spark plug in accordance with the prior art;

FIG. 2 is a cross-sectional view of the shaping arbor of FIG. 1;

FIG. 13 shows an exemplary machining arbor;

FIG. 14 is an enlarged view of a cutting element of the machining arbor of FIG. 13;

FIG. 15 is an enlarged view of a cutting element of a machining arbor;

FIG. 16 is a side view of a cutting element of an exemplary machining arbor;

FIG. 17 is an isometric view of a cutting element of an exemplary machining arbor;

FIG. 21 shows an end portion of an exemplary machining arbor in accordance with another embodiment.

DESCRIPTION

The method and tools described herein may be used to make an insulator for a condition sensing spark plug, such as a thermocouple spark plug. In many condition sensing spark plugs, a thermocouple or other sensor is located on the outer surface of an insulator nose so that it is exposed to a combustion chamber and can take readings therein. The readings or other data are transmitted back to some type of sensing, display, or processing device through one or more wires embedded in channels extending in the insulator. Some conventional methods for making insulators having these wire receiving channels utilize a process of forming an unfired insulator body around a special shaping arbor, such as a shaping arbor 4 shown in FIG. 1. With reference to FIGS. 1 and 2, the shaping arbor 4 includes axially extending fins 6, 8 that ultimately form channels in an axial bore of the insulator once the insulator body is fired and the shaping arbor is removed. However, particularly with the use of high alumina-based ceramic compositions, removal of the shaping arbor can crack or otherwise damage the insulator because of the very thin fins 6, 8 used to form channels to accommodate the sensor wires. The fins 6, 8 must be absolutely parallel so that the fired insulator can be removed without breakage. Furthermore, the shaping arbors themselves are very difficult to make and can be very expensive due to the close tolerances required.

Being able to adapt an insulator for a condition sensing spark plug without using special shaping arbors may save significant time and cost. Condition sensing spark plugs, such as automotive thermocouple spark plugs, can be important tools for understanding engine performance, diagnosing engine problems, and developing an appropriate spark plug and spark plug firing conditions for particular engine types. It should be understood that the methods and tools herein may be used to make insulators for any type of condition sensing spark plug that requires wires, leads, or other sensor components embedded or extending within the insulator. Condition sensing spark plugs may include but are not limited to pressure sensing spark plugs, gas composition sensing spark plugs, or temperature sensing spark plugs such as thermocouple spark plugs, to cite a few examples. Although the following description is provided in the context of an automotive thermocouple spark plug, it should be appreciated that the insulator and method described herein may be used with any type of spark plug or ignition device being adapted for use with a sensing device, including glow plugs, industrial plugs, aviation igniters and/or any other device that is used to ignite an air/fuel mixture in an engine.

Figure 3:
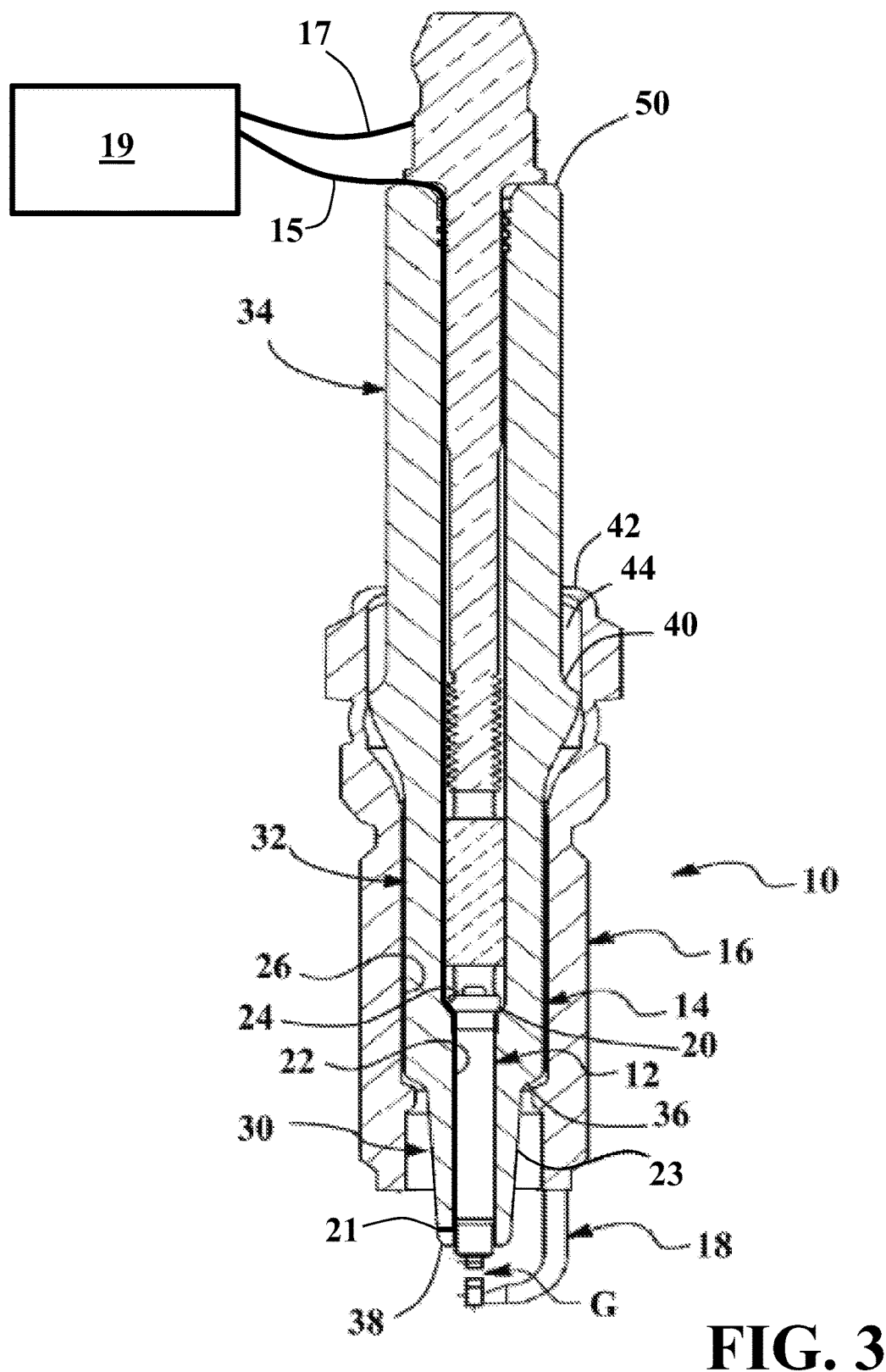
FIG. 3 is a cross-sectional view of an exemplary condition sensing spark plug.

An exemplary condition sensing spark plug is shown in FIG. 3, where the spark plug includes a sensing device for measuring various engine conditions. The spark plug 10 includes a center electrode 12, an insulator 14, a metallic shell 16, and a ground electrode 18. The insulator 14 is adapted by way of the present tooling and method to have channels for receiving wiring 15, 17 for a sensing, display, or processing device 19. The center electrode 12, which can be a single unitary component or can include a number of separate components, is at least partially disposed or located within an axial bore 22 that extends along the axial length of the adapted insulator 14. As illustrated, the axial bore 22 includes one or more internal step portions 24 that circumferentially extend around the inside of the bore and are designed to receive complementary external step portions 20 of the center electrode 12. In the exemplary embodiment of FIG. 3, the axial bore 22 only includes a single internal step or shoulder portion 24; however, it is possible for the axial bore to include additional internal step portions at different axial positions along the length of the bore. The adapted insulator 14 is at least partially disposed within an internal bore 26 of the metallic shell 16, and the internal bore 26 extends along the length of the metallic shell and is generally coaxial with the axial bore 22. In the particular embodiment shown, a tip end of the insulator 14 extends from and protrudes beyond the end of the metallic shell internal bore 26, and a tip end of the center electrode 12 extends from and protrudes beyond the insulator axial bore 22. The tip end of the center electrode 12 forms a spark gap G with a corresponding portion of the ground electrode 18; this may include embodiments with or without precious metal firing elements on the center electrode and/or the ground electrode. In the FIG. 3 embodiment, both the center and ground electrodes 12, 18 have precious metal firing elements attached thereto, but the disclosed spark plug arrangement is simply provided as an example and is not required.

Turning now to the adapted insulator 14, the insulator body is an elongated and generally cylindrical component that is made from an electrically insulating material and is designed to isolate the center electrode 12 from the metallic shell 16 so that high-voltage ignition pulses in the center electrode are directed to the spark gap G. The adapted insulator 14 includes an axial bore 22 and an outer surface 23. Along its length, the adapted insulator 14 includes a nose portion 30, an intermediate portion 32, and a terminal portion 34. However, other configurations or embodiments are certainly possible.

The nose portion 30 extends in the axial or longitudinal direction between an external step 36 on the outer surface 23 of the insulator and a distal end 38 located at a tip of the insulator. The outer surface may include other structural features not shown in FIG. 3 such as an annular rib to limit or prevent carbon fouling and other build-up. The nose portion 30 may have a continuous and uniform taper along its axial extent, or it could have sections of differing taper or no taper at all (i.e., straight sections where the outer surfaces are parallel to one another). Moreover, the extent to which the nose portion 30 axially extends or protrudes beyond the end of the metallic shell 16 (sometimes referred to as the "projection"), may be greater or less than that shown in FIG. 3. In some cases, it is even possible for the distal end or tip 38 of the nose portion to be retracted within the insulator bore 22 so that it does not extend beyond metallic shell at all (i.e., a negative reach).

The intermediate portion 32 of the insulator extends in the axial direction between an external locking feature 40 and the external step 36 described above. In the particular embodiment illustrated in FIG. 3, the majority of the intermediate portion 32 is located and retained within the internal bore 26 of the metallic shell 16. The external locking feature 40 may have a diametrically-enlarged shape so that during a spark plug assembly process, an open end or flange 42 of the metallic shell can be folded over or otherwise mechanically deformed in order to securely retain the adapted insulator 14 in place. The folded flange 42 also traps an annular seal or gasket 44 in between an exterior surface of the insulator 14 and an interior surface of the metallic shell 16 so that a certain amount of sealing is achieved. Other intermediate portion features are certainly possible as well.

The terminal portion 34 is at the opposite end of the insulator as the nose portion 30 and it extends in the axial direction between the external locking feature 40 and a second distal end 50. In the illustrated embodiment, the terminal portion 34 is quite long, however, it may be shorter and/or have any number of other features, like annular ribs. During operation, the terminal portion 34 is generally situated outside of the combustion chamber of the engine.

Wires 15, 17 at least partially extend along the length of the axial bore 22 of the adapted insulator 14 from the terminal portion 34 so that they end at or near the distal end 38 of the nose portion 30, and can accordingly sense various engine conditions such as temperature. It should be noted that the insulator channel for wire 17 is not shown in FIG. 3 as it is situated behind other spark plug components. In the illustrated embodiment, the wires 15, 17 join at a junction region 21 on the outer surface 23 of the nose portion 30 of the spark plug insulator, but such an arrangement is merely an example. Wires 15, 17 are shown as part of an exemplary thermocouple spark plug 10 and are connected to a sensing device 19; however, it should be understood that there may be only one wire, lead, or other sensor component in the axial bore of the adapted insulator, or there may be more than two wires, leads, or other sensor components. Further, the sensor and/or the sensing device may be a pressure sensor, a gas composition sensor, or any other sensor or device that may be beneficial for sensing engine conditions. Skilled artisans will appreciate that there may be any number and/or combination of wires, leads, or other sensor components that may be compatible with numerous types of sensors. Moreover, the particular ending point of wires, leads, or sensor components may vary. For example, channels may be formed along any portion of the insulator or extend the entire axial length of the insulator, as will be described in more detail below, yet still fall within the scope of the described methodologies.

Figures 4, 5:
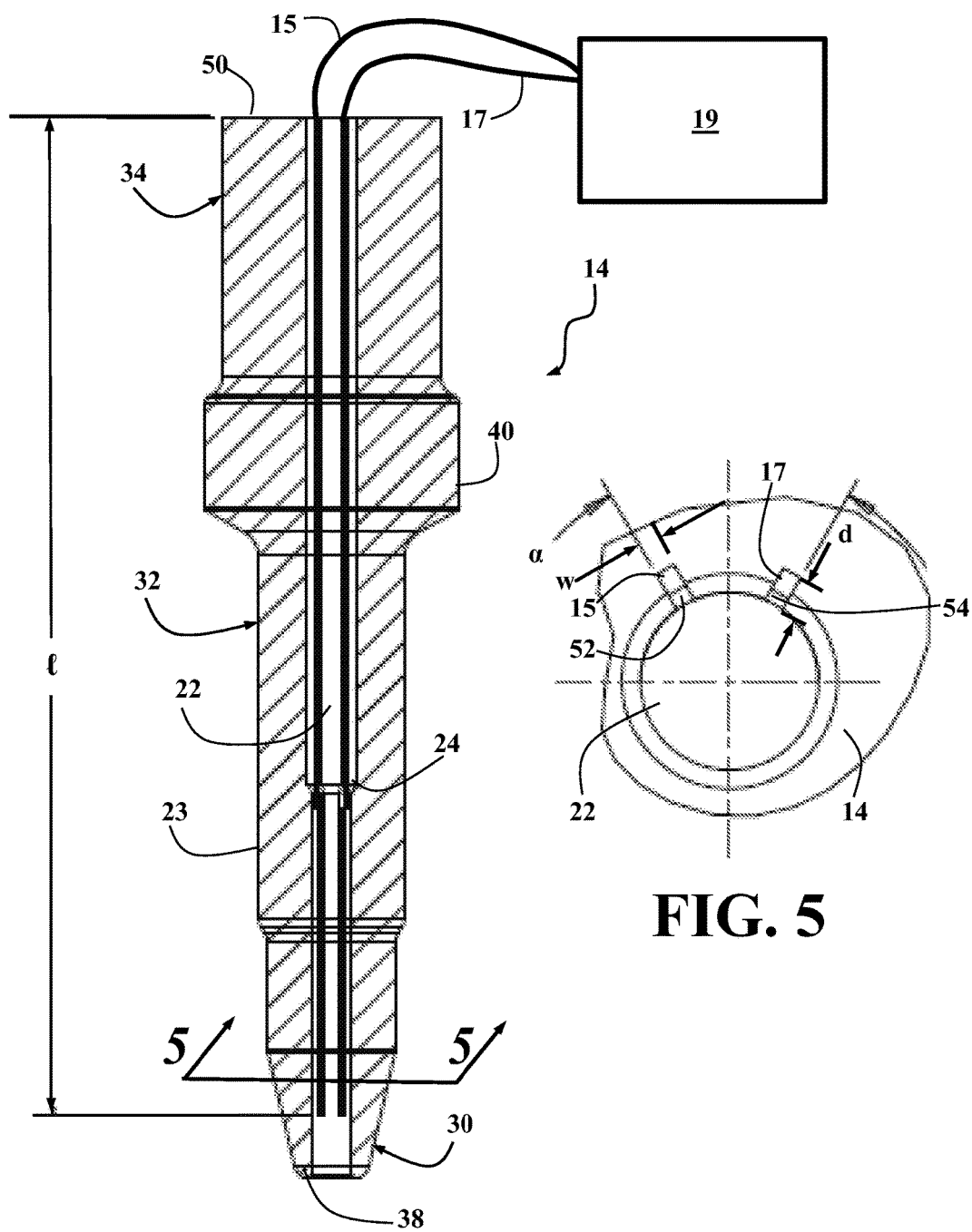
FIG. 4 is a cross-sectional view of an exemplary insulator for a condition sensing spark plug.
FIG. 5 is a partial, cross-sectional view of the insulator of FIG. 4 taken along line 5-5.

With reference to FIG. 4, there is shown a cross-section of the insulator 14 taken along an angle so as to reveal the channels for wires 15, 17 which are angularly spaced around the axial bore 60° from one another. Wires 15, 17 extend an axial length l of the axial bore 22 of the adapted insulator 14. It should be understood that the axial length l is variable, and accordingly, the wires may end at variable locations along the axial bore of the insulator. Moreover, the wires may be fully or partially embedded into the insulator. For example, the wires may be electrically isolated from the center electrode by using a potting compound. With reference to FIG. 5, which is a partial, cross-sectional view of the insulator shown in FIG. 4 taken along line 5-5, it is shown that the wires 15, 17 are separated by angle α. In a preferred embodiment, angle α is 60°; however, other angular orientations are certainly possible. The wires 15, 17 are accommodated in machined channels 52, 54, respectively. Channels 52, 54 may have a depth d that extends radially from the axial bore 22 toward the outer surface 23 of the insulator 14. In a preferred embodiment, the depth d is approximately 0.5 mm. Channels 52, 54 may further include a width w that extends along the circumference of the axial bore 22. In a preferred embodiment, the width w is approximately 0.5 mm. However, the channels 52, 54 may be sized and shaped differently in order to accommodate any number of different wires.

Figure 6:
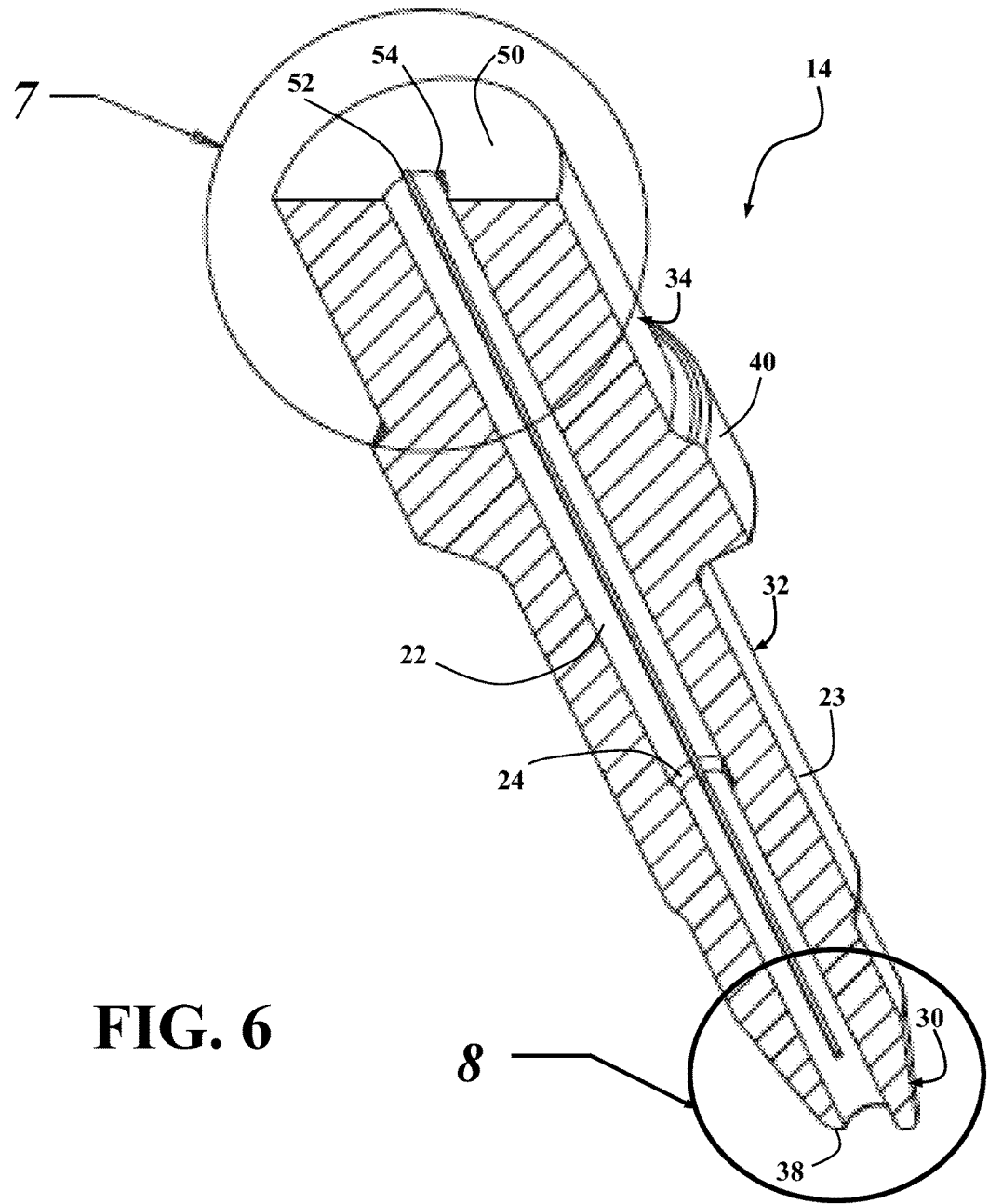
FIG. 6 is a perspective view of an exemplary insulator.
Figure 7:
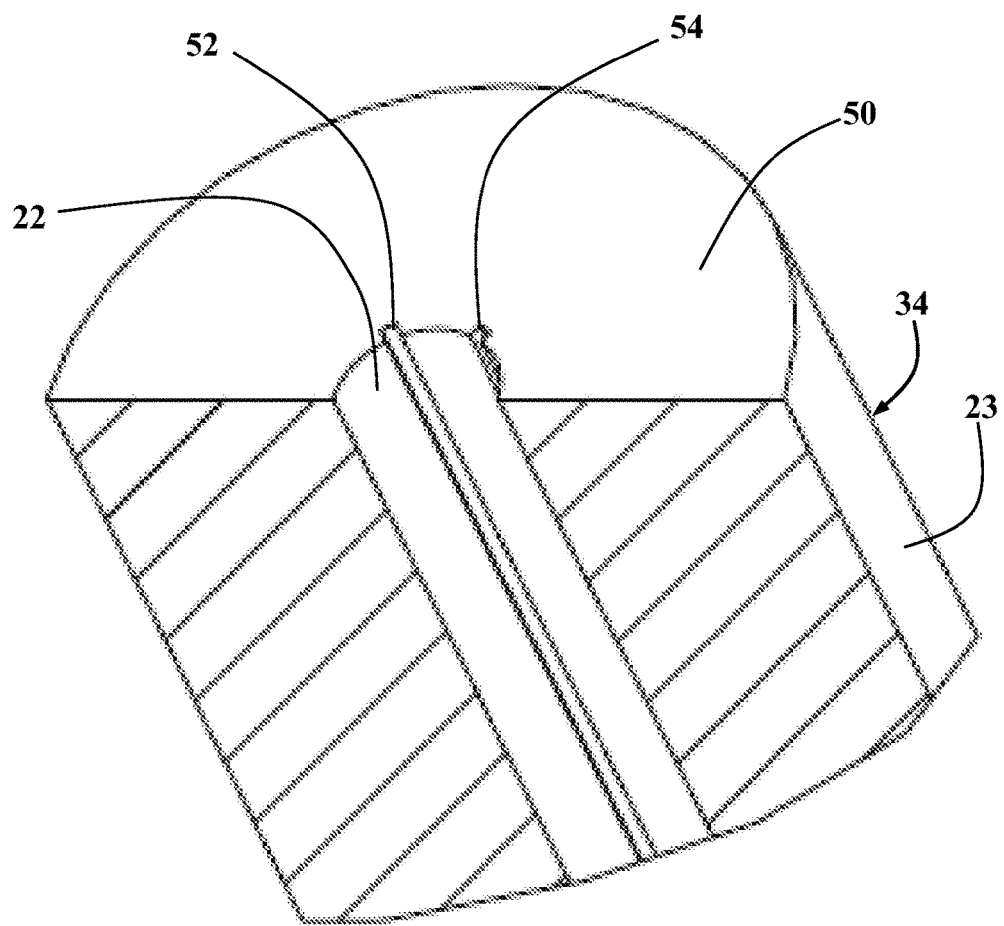
FIG. 7 is an enlarged view of a terminal end portion of the insulator of FIG. 6.

With reference to FIGS. 6-7, the machined channels 52, 54 generally extend along the internal surface of the axial bore 22 of the insulator 14 from the second distal end 50 of the terminal portion 34 toward the first distal end 38 of the nose portion 30. The channels may have variable depths or widths, depending on the size of the wire, lead, or other sensor component, or based upon the degree of radial embeddedness that is desired. Similarly, the depth of the channels 52, 54 may differ between the portions on either side of the shoulder 24, or it may be consistent between the portions on either side of the shoulder 24. It should be understood that there can be one channel, two channels as depicted in FIGS. 6-7, or more than two channels. The method and tooling equipment described below are not limited to a particular number, configuration, or type of channel, as any channel orientation, location, or structure, is certainly possible.

Figure 8:
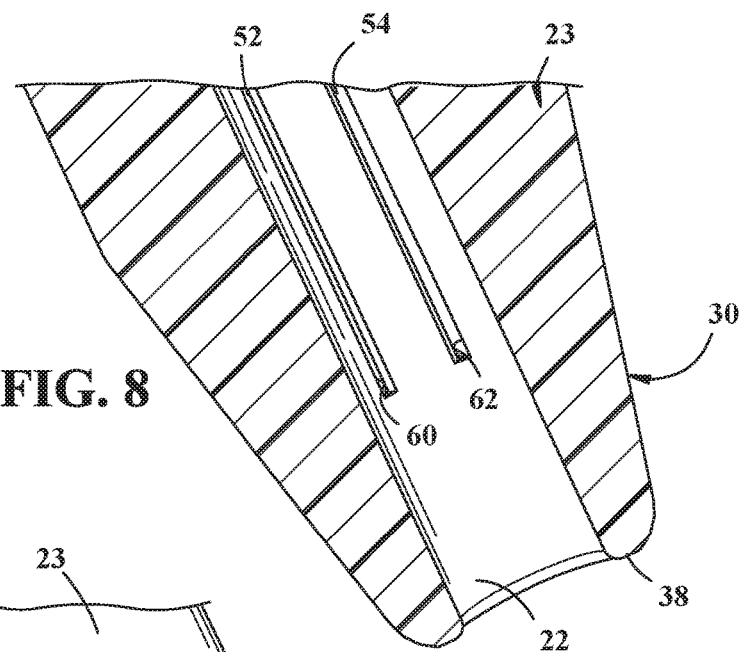
FIG. 8 is an enlarged view of a nose portion of the insulator of FIG. 6.
Figure 9:
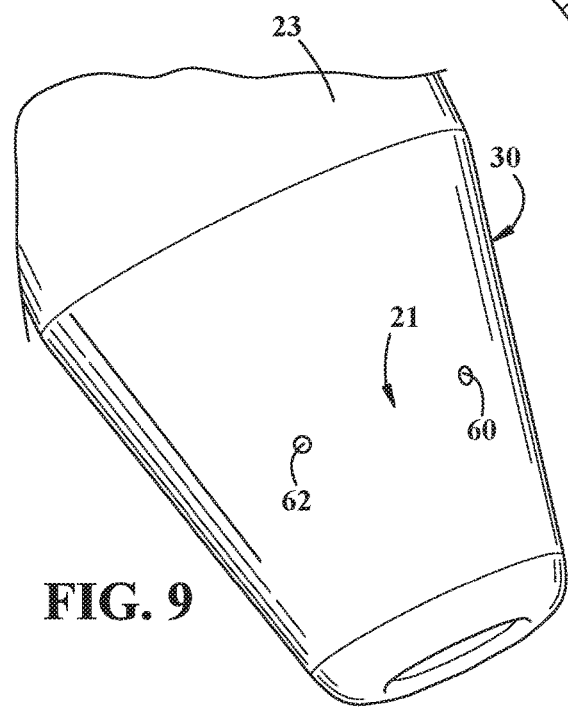
FIG. 9 is an enlarged view of a nose portion of an insulator.

With reference to FIG. 8, channels 52, 54 partially extend along the length of the axial bore 22 to a location near the distal end 38 of the nose portion 30. Radial passageways 60, 62 are drilled or otherwise formed in the insulator 14 to allow the wires to join at the outer surface 23 of the insulator. In a preferred embodiment, the radial passageways are situated 1-2 mm from the distal end 38 of the nose portion 30, but this can vary. FIG. 9 shows the outer surface 23 of the insulator 14 with radial passageways 60, 62 that generally define the junction region 21 for the wires (not shown) of the condition sensing spark plug. Radial passageways are optional. If, for example, the channels extend the entire length of the axial bore of the insulator, it may not be necessary to include radial passageways as the wires would simply extend from the axial bore opening at the distal end 38. Similarly, if the sensing wires, leads, or other components only need to be near the combustion chamber, radial passageways may not be necessary. The presence, absence, structure, and/or size of radial passageways will vary depending on the type of sensor and its various components. The method and tooling assemblies described herein are meant to be adaptable to any insulator for a condition sensing spark plug.

Figure 10:
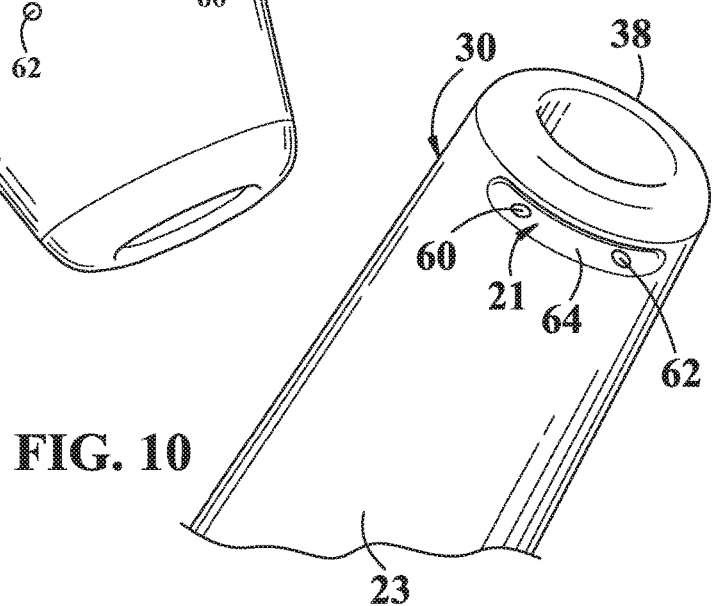
FIG. 10 is a perspective view of a nose portion of an insulator in accordance with another embodiment.

With particular automotive thermocouple spark plugs, such as the spark plug 10 illustrated in FIG. 3, wires 15, 17 extend from the second distal end 50 of the terminal portion 34 toward the first distal end 38 of the nose portion 30, meeting at the junction region 21 on the outer surface 23 of the adapted insulator 14. An enlarged view of the junction region 21 is shown in FIGS. 9 and 10. In the illustrated embodiments, the junction region 21 is generally defined by the radial passageways 60, 62. With particular reference to FIG. 10, a groove 64 in the outer surface 23 of the insulator forms the junction region 21. Once the wires and thermocouple bead or junction are in place, a potting compound may be used to fill the groove 64 in order to isolate the wires from the engine environment. This may be accomplished with an alumina based potting compound applied in such a way that only the bead or junction of the thermocouple remains exposed. The groove 64 is optional, and it may be used to help shield the wires, leads, or other sensor components from the harsh conditions of the combustion chamber.

It should be noted that the exemplary embodiments shown in FIGS. 3-10 and described above is only meant to serve as one example of an adapted insulator for sensing engine conditions that is made according to the process taught herein, as the process and tooling may be used to make other insulator embodiments, including those that differ significantly from insulator 14. Furthermore, spark plug 10 is not limited to the displayed embodiments and may utilize any combination of other known spark plug components, such as terminal studs, internal resistors, internal seals, various gaskets, precious metal elements, etc., to cite a few of the possibilities. Spark plug 10 may similarly include any combination of other sensing components or devices and is not limited to the illustrated embodiments provided.

Figure 11:
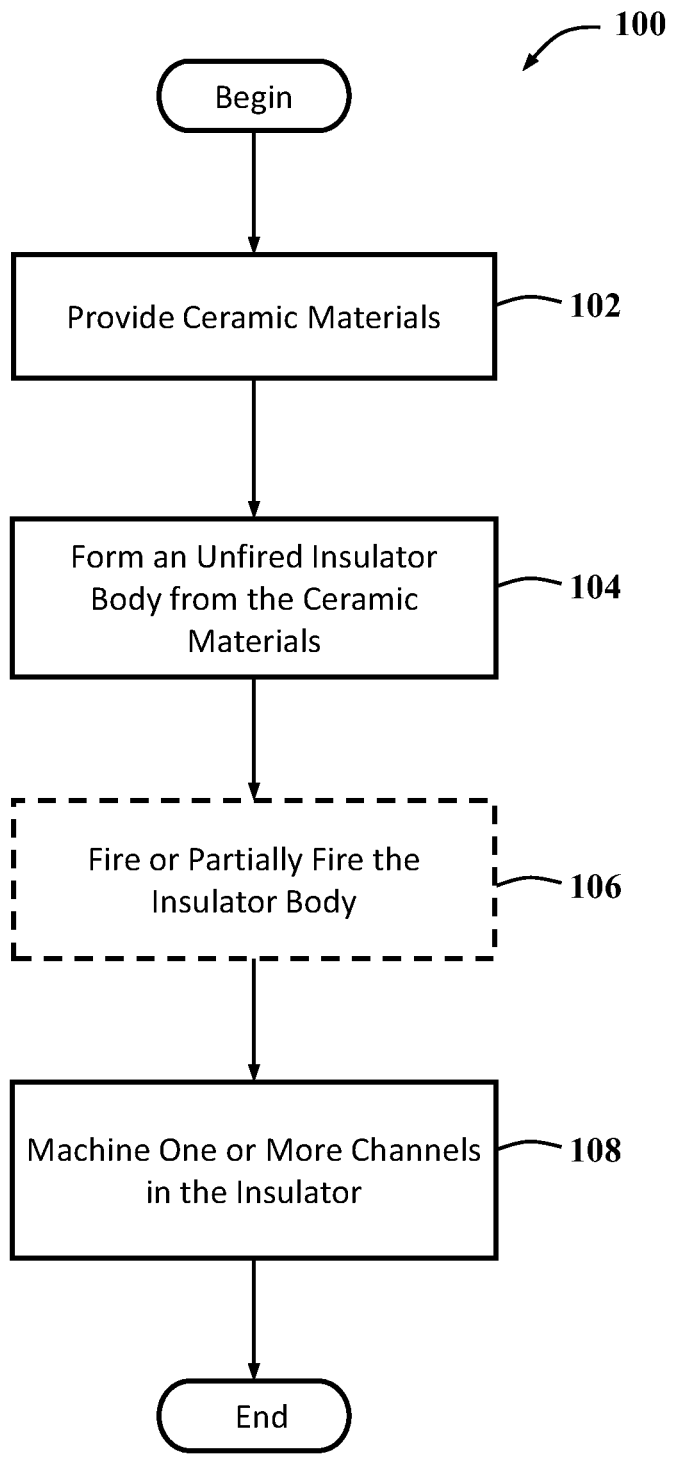
FIG. 11 is a flowchart that illustrates the different steps or stages of an exemplary method for manufacturing an insulator for a condition sensing spark plug.

Turning now to FIG. 11, there is shown a flowchart that illustrates an exemplary process 100 for making an adapted insulator for a condition sensing spark plug, such as insulator 14. Beginning with step 102, the method involves providing ceramic materials. In a preferred embodiment, the ceramic materials are alumina-based materials, but other ceramic compositions are certainly possible. Step 102 may involve the addition of various ceramic particles, liquid media, or binders. In one particular embodiment, the ceramic materials may include about 50% ceramic particles, 48% liquid medium such as water, and 2% binder such as methylcellulose (by volume). According to an exemplary embodiment, the ceramic particles are provided in the form of alumina, talc, and/or clay powder, the liquid medium is water, and the binder is comprised of a cellulose polymer. The mixture may then be spray-dried to form a granular ceramic powder which can subsequently be pressed in step 104. A non-limiting example of a suitable ceramic particle composition (by weight) is a ceramic powder mixture that includes about 87.7-92.6 wt % alumina, 3.5-7.3 wt % kaolin, 0-1.6 wt % talc, 2.8-4.9 wt % calcium carbonate and 0-0.3 wt % zirconia, and has a typical particle size of about 2.5-3.5 µm. Another suitable ceramic particle composition includes about 98.19 wt % alumina, 0.84 wt % kaolin, 0.22 wt % talc, 0.68 wt % calcium carbonate and 0.08 wt % zirconia, and has an average particle size of about 1.2-1.8 µm. Of course, other ceramic materials could be used instead, including but not limited to 90-99 wt % alumina or 87.7-98.9 wt % alumina as a ceramic particle composition, or any of the other examples set forth in U.S. Pat. No. 7,169,723, which is hereby incorporated by reference in its entirety.

Step 104 of the method 100 involves forming an unfired insulator body from the ceramic materials provided in step 102. At this point in the process, the insulators are typically considered to be in a "green" state. The unfired insulator body may be formed via an isostatic pressing process, and in a preferred embodiment, may be formed via a dry-bag isostatic pressing process, which involves high-pressure shaping of the powder-based ceramic materials. However, other processes may be used to form an unfired insulator body, such as die pressing or extrusion, to cite a few possibilities. Typically, the unfired insulator body includes the formation of axial bore, which may be done via a shaping arbor or other method. It should also be noted that other shaping, grinding, lapping, polishing, or other ceramic-related forming processes may be included within the scope of step 104.

Step 106 is optional, and may involve partially firing or completely firing the insulator body. In a preferred embodiment, the insulator body is partially fired at step 106. Partially firing generally involves partially sintering the insulator body such that there is some bonding between the ceramic particles and the insulator is in a calcine state with a chalk-like consistency. Partially firing the insulator may involve firing the insulator body in a kiln at 800° C. to 1200° C. In a preferred embodiment, the insulator body is partially fired in a kiln at 1000° C. for 30 minutes, but this may vary depending upon the ceramic materials and the sintering method employed. In another preferred embodiment, partially firing involves heating the insulator body to a temperature between 900° C. and 1000° C. At this point, the strength of the insulator body is greatly increased, but the ceramic is still relatively soft and easy to cut. Alternatively, it may be possible at step 106 to completely fire the insulator body until it reaches the density required for use in a condition sensing spark plug. In one embodiment, the onset of shrinkage or densification occurs around 1300° C., with full density being reached at about 1550-1600° C. Any known drying and/or heating techniques, such as sintering, may be used to form or otherwise transform the insulator body into a dense and solidified insulator for use in a condition sensing spark plug. Again, step 106 is optional, and the machining step described below may instead be performed on an unfired insulator body.

Figure 12:
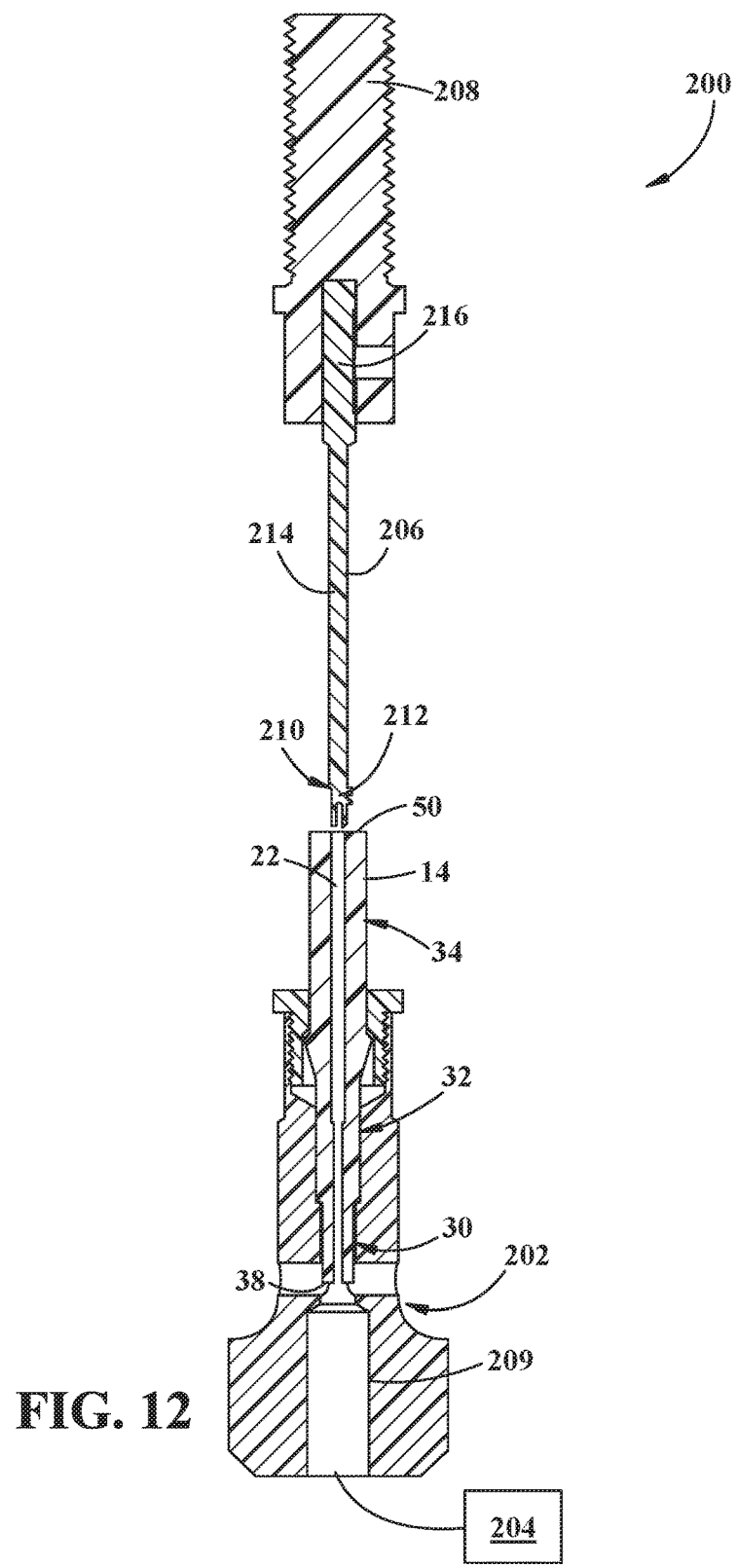
FIG. 12 shows exemplary tooling equipment that may be used to accomplish step 108 of the exemplary method illustrated in the flowchart of FIG. 11.

Step 108 involves machining one or more channels in the insulator 14. Step 108 may be performed with the exemplary tooling equipment 200 depicted in FIG. 12. The tooling equipment 200 generally includes an insulator holder 202, a displacement generator 204 shown schematically, and a machining arbor 206. In accordance with the illustrated embodiment, although not necessary, the machining arbor 206 may be held by guiding member 208. Further, as will be described below, the particular arrangement or configuration of tooling equipment components is not limited to the embodiment illustrated in FIG. 12, but includes any operable arrangement or configuration. During step 108, it is desirable to facilitate axial movement of the machining arbor with relation to the insulator, axial movement of the insulator with relation to the machining arbor, or axial movement of both with relation to each other. This feeding motion or feed rate is in addition to motion provided by the displacement generator 204. The feed can be constant or variable up to the length of the channel, such as axial length l shown in FIG. 4, and may be facilitated through the use of the guiding member 208, an external slide driven by a servo, or another drive device, to cite a few examples.

The insulator holder 202 holds insulator 14 in place during the machining step 108. While insulator holder is shown to hold the insulator 14 with the terminal end portion 34 closest to the machining arbor 206, it is also possible to design an insulator holder where the nose portion is oriented closest to the machining arbor. The insulator holder 202 may be capable of moving, such as vibratory moving from displacement generator 204. In another embodiment, the insulator holder may generally be stationary while the displacement generator 204 moves the machining arbor 206 or the guiding member 208. Other operable arrangements are certainly possible, so long as there is relative movement between the machining end of arbor 206 and the insulator.

The displacement generator 204 can provide high frequency vibrations that enhance the machining process. Typically, the movement is provided in an axial direction. The displacement generator may be directly or indirectly coupled to the machining arbor 206, the insulator 14, or the insulator holder 202. For example, a sonotrode 209 may be used in conjunction with the displacement generator to amplify axial displacement when tuned to the resonant frequency of the displacement generator 204. Such an arrangement may be desirable if an ultrasonic displacement generator is used, although it is not necessary. It should be noted that the displacement generator may come in a variety of forms, such as mechanical, electro-mechanical, pneumatic, etc. If another displacement generator is used instead of an ultrasonic displacement generator, the insulator holder 202 may be directly coupled to the displacement generator. In a preferred embodiment, the displacement generator 204 is a piezoelectric vibratory unit that is coupled to the insulator holder 202 and provides vibratory motion ranging in frequency from 10 kHz to 35 kHz. In another preferred embodiment, the displacement generator is tuned to a resonant frequency. However, it should be understood that the motion need not have a constant frequency or amplitude.

The machining arbor 206 generally includes a first end 210 that includes at least one cutting element 212 on a cutting face 214 that extends to a second end 216. As previously mentioned, the second end 216 of the machining arbor 206 may be held or otherwise coupled to a guiding member 208. If a guiding member is used, typically the machining arbor 206 is guided in a stepping motion that includes slight retractions to assist in the removal of swarf. In a preferred embodiment, the machining arbor 206 is made from tool steel, but another material is certainly possible so long as it is capable of cutting ceramic. In another preferred embodiment, the machining arbor 206, or a portion of the machining arbor such as the cutting element 212, is diamond coated. A diamond coated cutting element 212 is preferred if the insulator body to be machined is fully fired. Because a fully fired insulator is so dense, the machining step 108 is usually slower, and the diamond coating may provide added strength to machine the channels of a fully fired insulator. The use of an abrasive slurry, compressed air, a coolant, a lubricant, or a liquid cutting fluid that both cools and lubricates may be desirable as well, and may assist in cutting the channels by removing the swarf and/or cooling the insulator during the machining step 108.

FIGS. 13-22 show various views and embodiments of machining arbors. With reference to FIG. 13, there is shown an enlarged view of the machining arbor 206 that includes the first end 210 with the cutting element 212 on the cutting face 214 which extends to the second end 216. FIG. 14 is an enlarged view of the cutting element 212 showing cutting surfaces 218, 220. FIG. 14 also shows swarf removal area 222 located along side of the cutting face 214 so that material can be removed as the cutting element machines a channel in the side of the insulator axial bore. Another swarf removal area 224 is situated along the other side of the cutting face 214 such that swarf removal areas 222, 224 are located along opposite sides of the machining arbor 206. Swarf removal areas 222, 224 allow for the accumulation of swarf in an area away from the cutting element 212, which in the illustrated embodiment is aligned generally perpendicularly to the cutting face 214. The cutting face 214 may also help facilitate swarf removal. Other angular orientations, sizes, and configurations of the swarf removal areas are certainly possible.

In the illustrated embodiments, the cutting element 212 is in a saw-tooth form that is comprised of two cutting surfaces 218, 220. This can be seen in the various side views of the cutting element 212 in FIGS. 15-17. Other forms are certainly possible, and more or less cutting surfaces are possible as well. The cutting surfaces 218, 220 are arranged at an approximate 45° angle with the cutting face 214, but such an angular orientation is not required. The particular configuration of the illustrated cutting element 212 allows the first cutting surface 218 to do about half of the machining work, while the second cutting surface 220 can do the remainder of the machining work. The cutting element 212 may serve to locate and guide the machining arbor through the axial bore of the insulator through contact with the machined channel.

Figure 18:
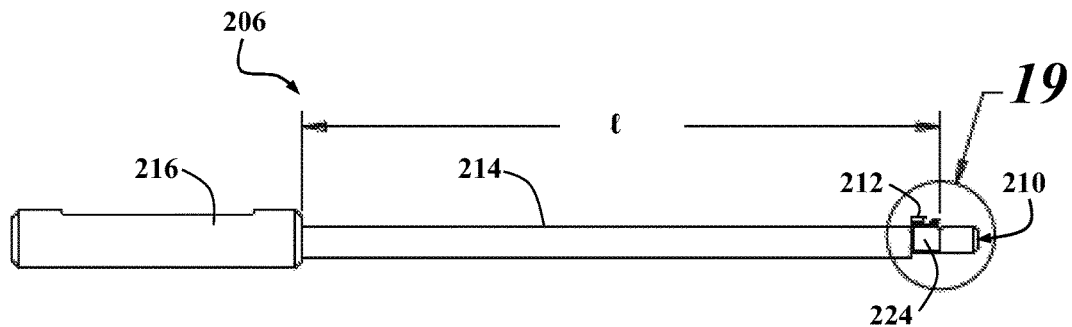
FIG. 18 is a side view of an exemplary machining arbor.
Figure 19:
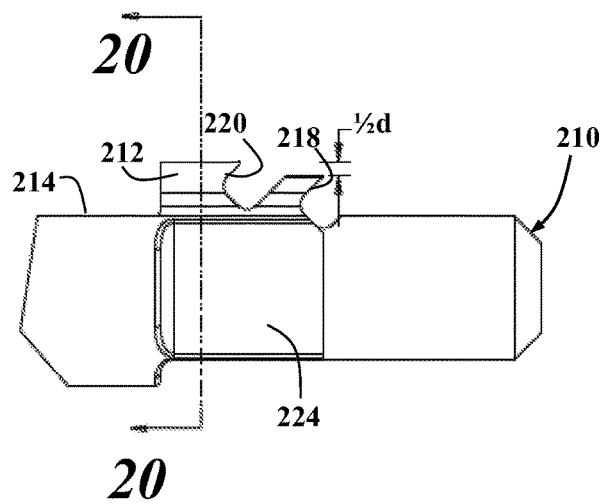
FIG. 19 is an enlarged view of a cutting element of the machining arbor of FIG. 18.
Figure 20:
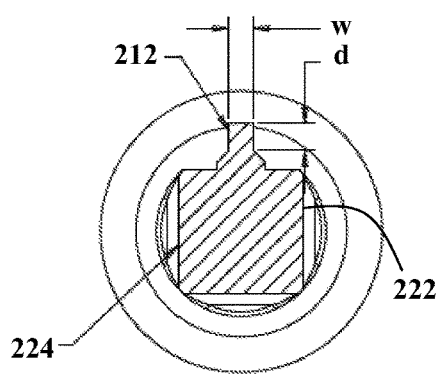
FIG. 20 is an end view of the exemplary machining arbor of FIG. 18 taken along line 20-20 of FIG. 19.

FIGS. 18-20 show the dimensions of the machining arbor 206 and their relation to the dimensions of the axial bore of the insulator and the machined channels in the axial bore. The diameter of the machining arbor 206 may be designed with particular relation to the diameter of the axial bore that will be machined, and accordingly must be smaller in size than the diameter of the axial bore to facilitate machining along its axial length. With reference to FIGS. 4 and 18, the machining arbor 206 may have a length between the cutting element 212 and the second end 216 that corresponds with the axial length l of the machined channels. With reference to FIGS. 5 and 19, the machining arbor 206 may have a cutting element 212 where the respective heights of the cutting surfaces 218, 220 from the cutting face 214 are variable. More particularly, the cutting surfaces 218, 220 may differ in height in an amount that is equal to half of the depth d of the channel that is ultimately machined. With reference to FIGS. 5 and 20, the profile of the cutting element 212 may have dimensions that generally coincide with the width w and the depth d of the machined channels. It should be noted that while dimensional relationships between the machining arbor 206 and the axial bore 22 of the insulator 14 may exist, they are not necessary. For example, a smaller cutting element may be used and multiple passes with the machining arbor may be performed in order to reach an equivalent channel depth. In another example, it may be possible to machine a single channel twice as wide to accommodate multiple wires. Other examples are certainly possible.

Figure 22:
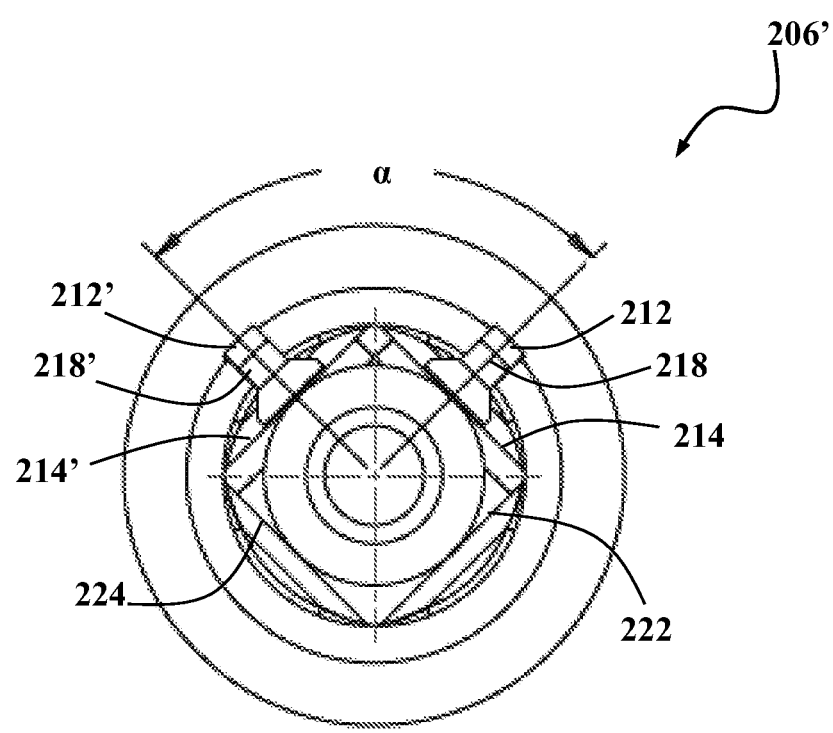
FIG. 22 illustrates an end view of the exemplary machining arbor of FIG. 21.

FIGS. 21 and 22 show partial views of another embodiment of a machining arbor 206' that includes two cutting elements 212, 212' to machine two channels, where the two cutting elements 212, 212' are located towards a first end 210' and respectively include cutting surfaces 218, 220 and 218', 220'. The illustrated machining arbor 206' may be particularly useful for making insulators for condition sensing spark plugs that require the accommodation of multiple wires, leads, or other sensor components, such as the exemplary thermocouple spark plug 10. However, it may similarly be possible to use machining arbor 206 with multiple passes to form multiple channels with a singular cutting element 212. It should be noted that the cutting faces 214, 214' may extend along the length of the machining arbor to the second end 216 or the cutting faces may just locally surround the cutting elements 212, 212' and abut a generally cylindrical portion that extends toward the second end. Furthermore, it is not necessary for the multiple cutting elements 212, 212' to be aligned along the axial length of the machining arbor. For example, it is possible to stagger the axial positions of the cutting elements. It may also be possible to include more than two cutting elements, if desired. With particular reference to FIG. 22, the cutting elements 212, 212' are angularly oriented around the circumferential perimeter of the machining arbor at an angle $\alpha$. In a preferred embodiment, angle $\alpha$ is approximately 60°, which corresponds to the machined channels 52, 54 depicted in FIG. 5. Other angular orientations with multiple cutting elements are certainly possible. Moreover, various other machining arbor structures and tooling assembly embodiments may be used to accomplish the machining step 108 of the method 100.

If at machining step 108, the insulator is an unfired insulator body or a partially fired insulator body, a subsequent sintering, heating, drying, or another ceramic densification process may need to be performed. Other method steps are certainly possible, including various shaping, lapping, or polishing steps, or drilling or otherwise forming radial passageways, for example. Ultimately, the adapted insulator is assembled into a condition sensing spark plug.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making an insulator for a condition sensing spark plug, comprising the steps of:

forming an insulator body from ceramic materials, wherein the insulator body includes a nose portion, a terminal portion, an intermediate portion between the nose portion and the terminal portion, and an axial bore extending an axial length of the insulator body; and machining at least one channel along the axial bore of the insulator body, wherein the channel accommodates a wire for the condition sensing spark plug.

2. The method of claim 1, further comprising the step of: completely firing or partially firing the insulator body after the forming step and before the machining step.

3. The method of claim 2, wherein the firing step includes partially firing the insulator body after the forming step and before the machining step by heating the insulator body in a kiln to a temperature between 800° C. and 1200° C. so that there is some bonding between the ceramic particles.

4. The method of claim 3, further comprising the step of: completely firing the insulator body after the machining step by heating the insulator body in a kiln to a temperature greater than 1200° C. so that a final ceramic densification of the ceramic particles takes place.

5. The method of claim 1, wherein the machining step includes machining the at least one channel along a partial length (axial length l) of the axial bore of the insulator body and drilling at least one radial passageway that connects with the channel and also accommodates the wire for the condition sensing spark plug.

6. The method of claim 5, wherein the at least one radial passageway is formed in the nose portion of the insulator body and extends from a circumferential groove formed on an outer surface of the insulator body to the at least one channel machined along the axial bore of the insulator body.

7. The method of claim 1, wherein the machining step includes machining first and second channels along the axial bore of the insulator body and drilling first and second radial passageways that connect with the first and second channels, respectively, wherein the first and second channels accommodate first and second wires for the condition sensing spark plug and are angularly separated from one another by an angle $\alpha$.

8. The method of claim 7, further comprising the step of: installing the first wire in the first channel and the first radial passageway so that it extends outside of the insulator body and installing the second wire in the second channel and the second radial passageway so that it also extends outside of the insulator body; and joining ends of the first and second wires at a junction region on an outer surface of the insulator body so that they form of thermocouple for the condition sensing spark plug.

9. The method of claim 1, wherein the ceramic materials include a ceramic particle composition having 87.7-98.19 wt % alumina.

* * * * *

UNITED STATES PATENT AND TRADEMARK OFFICE
CERTIFICATE OF CORRECTION

| | | |
|---|---|---|
| PATENT NO. | : 10,177,539 B2 | Page 1 of 1 |
| APPLICATION NO. | : 15/005426 | |
| DATED | : January 8, 2019 | |
| INVENTOR(S) | : Paul William Phillips | |

It is certified that error appears in the above-identified patent and that said Letters Patent is hereby corrected as shown below:

In the Claims

Claim 8, Column 12, Line 21 replace "of" with "a"

Signed and Sealed this
Thirtieth Day of July, 2019

Andrei Iancu
*Director of the United States Patent and Trademark Office*